US009613258B2

(12) United States Patent
Chen et al.

(10) Patent No.: US 9,613,258 B2
(45) Date of Patent: Apr. 4, 2017

(54) IMAGE QUALITY ASSESSMENT

(75) Inventors: Shaokang Chen, New South Wales (AU); Yong Kang Wong, New South Wales (AU)

(73) Assignee: iOmniscient Pty Ltd, Gordon (AU)

( * ) Notice: Subject to any disclaimer, the term of this patent is extended or adjusted under 35 U.S.C. 154(b) by 630 days.

(21) Appl. No.: 14/000,244

(22) PCT Filed: Feb. 20, 2012

(86) PCT No.: PCT/AU2012/000158
§ 371 (c)(1),
(2), (4) Date: Oct. 28, 2013

(87) PCT Pub. No.: WO2012/109712
PCT Pub. Date: Aug. 23, 2012

(65) Prior Publication Data
US 2014/0044348 A1    Feb. 13, 2014

(30) Foreign Application Priority Data

Feb. 18, 2011  (AU) ................................. 2011900557
Dec. 21, 2011  (AU) ................................. 2011905341

(51) Int. Cl.
*G06K 9/62*     (2006.01)
*G06K 9/00*     (2006.01)
*G06K 9/03*     (2006.01)

(52) U.S. Cl.
CPC ..... *G06K 9/00275* (2013.01); *G06K 9/00221* (2013.01); *G06K 9/036* (2013.01); *G06K 9/6202* (2013.01)

(58) Field of Classification Search
None
See application file for complete search history.

(56) References Cited

U.S. PATENT DOCUMENTS 8,885,918 B2 * 11/2014 Amanullah ........ G01N 21/8806
                                                    382/141
2008/0037838 A1 * 2/2008 Ianculescu ........ G06K 9/00228
                                                    382/118
(Continued)

FOREIGN PATENT DOCUMENTS

JP    2003296735    10/2003
JP    2011019192    1/2011

OTHER PUBLICATIONS

Sanderson, Conrad, Marc Saban, and Yongsheng Gao. "On local features for GMM based face verification." Information Technology and Applications, 2005. ICITA 2005. Third International Conference on. vol. 1. IEEE, 2005.*

(Continued)

*Primary Examiner* — Sumati Lefkowitz
*Assistant Examiner* — David Perlman
(74) *Attorney, Agent, or Firm* — Michael Best & Friedrich LLP (57) ABSTRACT

This disclosure concerns image quality assessment. In particular, there is described a computer implemented method, software, and computer for assessing the quality of an image. For example but not limited to, quality of the image of a face indicates the suitability of the image for use in face recognition. The invention comprises determining (112) a similarity of features of two or more sub-images of the image (608) to a model (412) of the object which is based on multiple training images (612) of multiple different objects of that type. The model (412) is comprised of sub-models (406) and each sub-model (406) corresponds to a sub-image of the image (608). Determining similarity is based on the similarity of features of each sub-image to features modelled by the corresponding sub-model. It is an advantage that no input parameters are required for quality assessment since the quality of the image can be determined (Continued)

from only the similarity between the image and the same, therefore single generic, model.

19 Claims, 5 Drawing Sheets

(56) References Cited

U.S. PATENT DOCUMENTS

| | | |
|---|---|---|
| 2010/0074479 A1 | 3/2010 | Chou et al. |
| 2010/0098343 A1 | 4/2010 | Perronnin et al. |
| 2012/0155765 A1* | 6/2012 | Joshi ................... G06K 9/036 382/172 |

OTHER PUBLICATIONS

Hegerath, Andre, Ing H. Ney, and T. Seidl. Patch-based Object recognition. Diss. Diploma thesis, Human Language Technology and Pattern Recognition Group, RWTH Aachen University, Aachen, Germany, 2006.*

International Search Report, PCT/AU2012/000158, Apr. 23, 2012.

Belongie et al., "Color- and Texture-Based Image Segmentation Using EM and Its Application to Content-Based Image Retrieval", Computer Vision, 1998, Sixth International Conference, Bombay, India, Jan. 4-7, 1998, pp. 675-682.

Japanese Patent Office Action for Application No. 2013-553746 with English Translation dated Dec. 1, 2015 (11 pages).

\* cited by examiner

IMAGE QUALITY ASSESSMENT

INCORPORATION BY REFERENCE

Incorporated herein by reference is the disclosures found in Australian provisional patent application No. 2011900557 filed on 18 Feb. 2011 entitled "Patch-based Probabilistic Image Quality Assessment for Face Selection and Improved Video Based Face Recognition". Also incorporated herein by reference is the disclosures found in Australian provisional patent application No. 2011905341 filed on 21 Dec. 2011 entitled "Image quality assessment".

TECHNICAL FIELD

This disclosure concerns image quality assessment. In particular, there is described a computer implemented method, software, and computer for assessing the quality of an image. For example but not limited to, quality of the image of a face indicates the suitability of the image for use in face recognition.

BACKGROUND ART

Image processing includes detecting objects in an image so that the image can be say enhanced or the object classified or identified.

Face recognition has become an important area of image processing. The technology for automatically detecting faces in images captured by cameras has many applications, such as biometric access control, security surveillance, image alignment and image tagging.

One of the main challenges in the field of face recognition is the fact the source images are captured by cameras that are not set up in ideal and controllable conditions. The resulting images often suffer from low underlying resolution, blur, large pose variation, low contrast and frequent lighting changes. As a result, the quality of multiple images of the same person may vary widely. This includes variations in (1) image specific quality, such as resolution, sharpness, contrast, compression artefacts and (2) face specific quality such as face geometry, pose, detectable eye and illumination angles.

Most current approaches to face recognition use a reference gallery comprising images of known faces and the aim is to reliably find a face in the gallery that matches the face in the probe image. Of course, the match has to be found even though the face in the gallery and the face in the probe image are captured with different quality, such as resolution, sharpness, contrast, compression artefacts, face geometry, pose, detectable eye and illumination angles.

DISCLOSURE OF INVENTION

In a first aspect there is provided a computer-implemented method for assessing quality of an image of an object, the method comprising:
   determining a similarity of features of two or more sub-images of the image to a model of the object which is based on multiple training images of multiple different objects of a same type, the model is comprised of sub-models where each sub-model corresponds to a sub-image of the image, wherein determining similarity is based on the similarity of features of each sub-image to features modelled by the corresponding sub-model; and
   determining the quality of the image based on the determined similarity of the two or more sub-images.

It is an advantage that no input parameters are required for quality assessment since the quality of the image can be determined from only the similarity between the image and the same, therefore single generic, model. It is a further advantage that no detection of actual elements of an object, such as eyes or nose in the case of faces, is required in this method. As a result, it is another advantage that the method is suitable for use with low quality images, such as low resolution images, where detection of elements is impossible.

It is an advantage that a model is constructed from multiple images of different objects of the same type. As a result, the similarity is not determined based on a series of comparisons to actual reference images. This reduces the computation time and enables the determination of the quality in real time. For example, the computation time is less than the time between subsequent frames of the streaming video. Computation time is also important for scaling of the method.

It is an advantage that by assessing sub-images the number of pixels that need to be considered for each similarity determination is reduced. As a result, the memory requirement and computation time are reduced. A further advantage is that the computation of the individual sub-images can be parallelised making the best use of modern multi-core computer architectures.

The method may be used as a pre-processing step for the image, and further processing may be based on the determined quality of the image. It is an advantage that the determination of quality can be used to select the better quality images for further processing which in turn improves the accuracy of the further processing.

Each training image may have multiple preferred characteristics that determine quality. It is yet a further advantage that a different quality (that is a quality based in a different set of characteristics to suit a different pre-processing purpose) can be determined using the same method simply by using a different set of training images that have the new preferred characteristics.

The preferred characteristics may be a predetermined shift in the object, predetermined rotation, predetermined scale, predetermined resolution, predetermined pose, predetermined illumination and where the object is a face.

Each sub-model may be based on a mean vector and a covariance matrix which are based on features of a sub-image of each training image that the sub-model is based on. It is an advantage that the model is only based on two parameters. As a result, the complexity of determining the similarity is reduced.

The features of a sub-image may be based on substantially only lower frequency components of the sub-image. The model may be based on substantially only lower frequency components of training images. Determining the similarity of a sub-image of the image to the model may be based on only similarity of the lower frequency components of the sub-image of the image to the model. It is an advantage that using only lower frequency components reduces the complexity compared to using all components of an image. Using only lower frequency components also concentrates the method on components that are generative for description rather than components that are discriminative and more useful for recognition. Only a small number of components, such as three, is necessary to determine the quality reliably.

Further, using low frequency components reduces the sensitivity to expression changes of faces which mainly lie in high frequency band.

The features may be based on Haar-like features, LBP or SIFT. It is an advantage that the method is flexible to be used with other feature generating methods that may be more suitable for a given situation.

The lower frequency components of the sub-images may be based on a discrete cosine transformation.

The object may be a face.

The features modelled by a sub-model may be a mean value of the features of a sub-image of each training image that the sub-model is based on.

Determining a similarity may be based on a Gaussian probability density function characterised by the mean value and a covariance matrix which are based on the features of a sub-image of each training images that the sub-model is based on.

Determining a similarity may comprise determining a probability for the features of the sub-image of the image based on the Gaussian probability density function. It is an advantage that a Gaussian probability density function is a simple way to accurately estimate the probability of the features of the sub-image. It is a further advantage that the Gaussian probability density function returns a value that does not need to be transformed for different training images or other changing input parameters. A threshold for the quality can therefore remain fixed and does not need to be adapted to different scenarios.

The step of determining a similarity of the two or more sub-images of the image to the model may be performed independently for each sub-image.

Determining similarity comprises determining one similarity measure for each sub-image and determining quality of the image is based on a combination of the determined similarity of the two or more sub-images. It is a further advantage that a single quality score is directly determined. As a result no fusion method is required, where different aspects of the image quality are measured separately, for example, contrast, sharpness, resolution, geometry, pose and illumination angles, by different algorithms and are fused together to generate one quality score.

Combining the similarities of all sub-images may comprise determining a probability for each sub-image independently and determining a joint probability for based on the probabilities for each sub-image of the image. It is an advantage that by independent determination of the probabilities for each sub-image, these probabilities can be simply multiplied for determining the joint probability. This multiplication can be conveniently transformed into a sum of logarithms, which results in lower computational complexity.

The sub-images of the image correspond with sub-images of each training image that the sub-model is based on. Typically, the sub-image of the image would be aligned, that is at the same location in the image as the sub-images of the training images that the corresponding sub-model is based on. The spatial relationship between sub-images of the image is the same as the spatial relationship between sub-images of the training images.

The method may further comprise the step of normalising the image based on a logarithmic normalisation function. It is an advantage that by the logarithmic normalisation function smaller intensity values are spread out while greater intensity values are compressed and that this increases the efficiency of the method.

The method may further comprise providing as output an indication of the determined quality of the image. The method may further comprise storing an indication of the determined quality of the image in non-volatile memory.

The method may further comprise the steps of:
repeating the method for multiple different images to determine the quality of each of the multiple images; and
performing further processing of the images based on the determined quality.

Further processing may comprise giving more weight to the images having higher quality. For example, the method may compromise identifying a subset of the multiple images that have higher quality and performing further processing on the subset of the multiple face images. In another example, further processing may place more emphasis on the images having better quality.

In yet another example the images may be based on a ranking such that a predetermined number of images with the better quality are identified for further processing. It is an advantage that a number of images can be predetermined for which further processing works best.

Further processing may be performing face recognition or face verification, such as on the subset of images. It is an advantage that not all of the multiple images need to be considered for face recognition but only a smaller number based on the determined quality. As a result, face images of low quality do not compromise the result of face recognition. As a further result, in a set of many low quality face images and only a small number of high quality face images, the high quality face images are not discarded as outliers.

Selecting the subset of the face images may be based on a quality threshold such that only face images with a quality better than the threshold are selected. It is an advantage that while receiving the face images it can be decided for each face image independently whether that image is used for further processing or discarded.

The image may be from a sequence of images, such as a frame of a video.

The method may further comprise the initial step of detecting an object in the frame and cropping the frame based on the detected object to form the image for use in the method described above.

The method may further comprise the step of identifying the two or more sub-images from the image.

In a second aspect there is also provided software, that is computer instructions recorded on non-volatile computer readable medium that when executed by a computer causes the computer to perform the method described above.

In a third aspect there is a computer to assess the quality of an image of an object, the computer comprising:
computer storage to store a model of the object which is based on multiple training images of multiple different objects of a same type, the model is comprised of sub-models where each sub-model corresponds to a sub-image of the image; and
a processor to determine a similarity of features of two or more sub-images of the image to the model, wherein determining similarity is based on the similarity of features of each sub-image to features modelled by the corresponding sub-model, and to determine the quality of the image based on the determined similarity.

The optional features of the first aspect described above are equally the optional features of the second and the third aspect.

BRIEF DESCRIPTION OF DRAWINGS

An example of the invention will now be described, where.

BEST MODE FOR CARRYING OUT THE INVENTION

Figure 1:
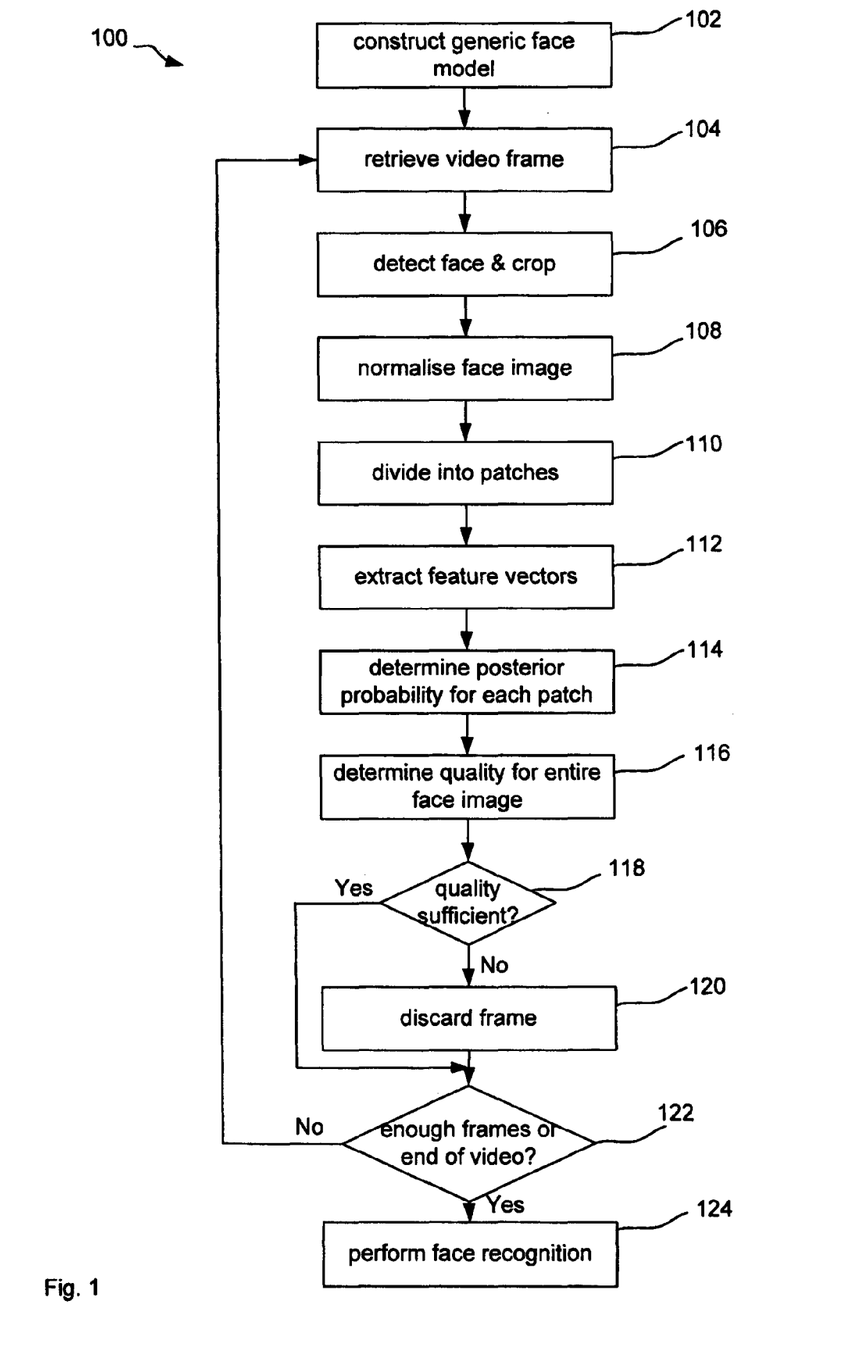
FIG. 1 illustrates a method for face recognition from streaming video or a video sequence.

This example relates to assessing image quality for face recognition from streaming video that is the object is a face. FIG. 1 illustrates a flowchart of the method 100 of this example.

Figure 5:
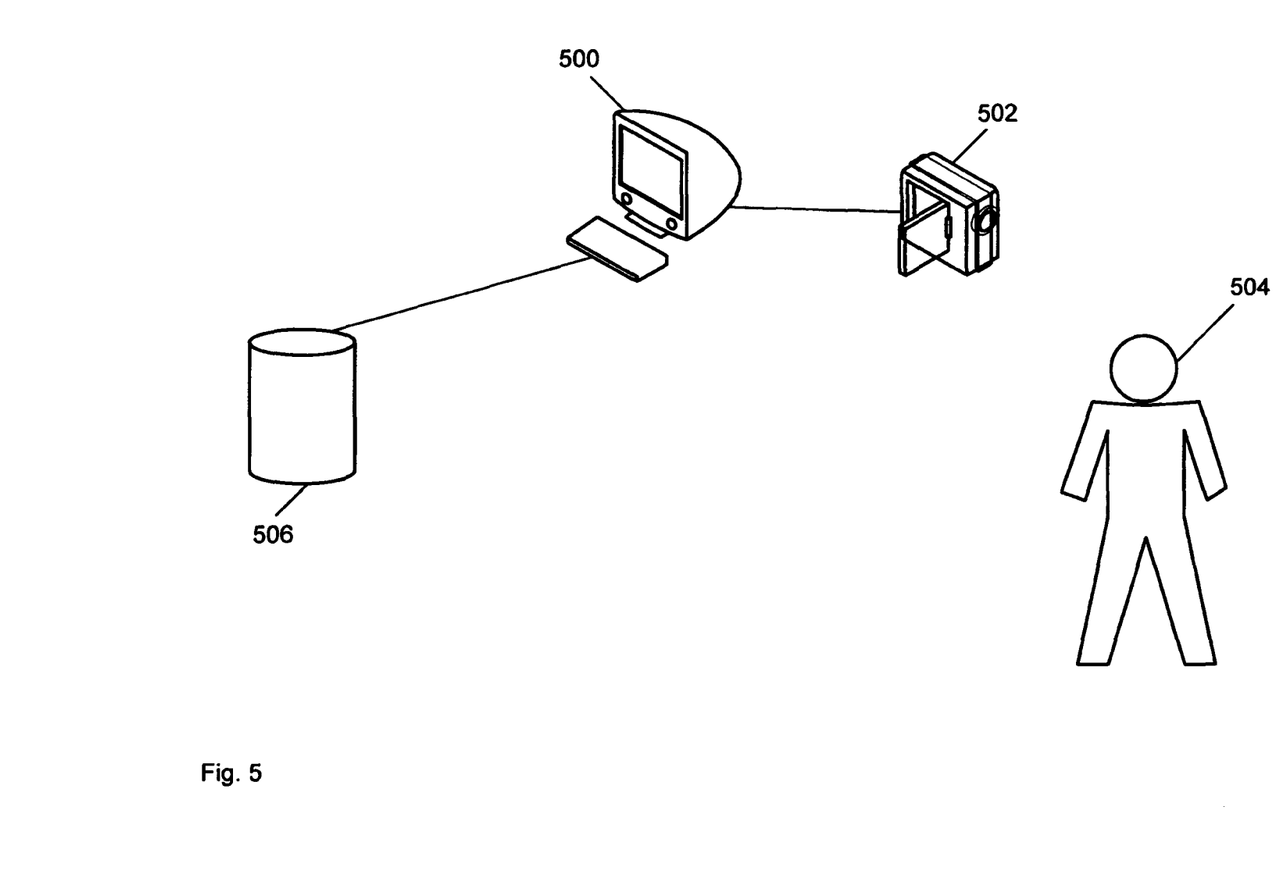
FIG. 5 illustrates a computer system to perform the method.

FIG. 5 shows a computer system that is able to perform the method 100. The computer 500 has application software installed to cause the computer system to operate in accordance with the method 100. The computer 500 also has input means typical of a personal computer, such as a keyboard, mouse and/or touch sensitive screen. The computer 500 includes internal and/or external storage 506 that includes a library of training images of faces of different people. In this example the training images are well aligned, centred faces, frontal face images under appropriate lighting with neutral facial expression. One exemplary library is the FERET dataset.

The method 100 is initialised by constructing 102 a generic face model. This initialisation step is typically performed once while the rest of the method 104 to 124 is repeated multiple times based on the same generic face model constructed in step 102.

The model is built with reference to a library of multiple training images that also capture different objects of the same type. In this case the object type is a face and each of the training image also capture a single face. Faces of multiple different people are captured in the training images.

Generic in this context of quality assessment means that one single model is constructed based on the multiple training faces in the library (typically all) and is therefore not specific of a particular person. This is in contrast to existing methods in the context of face recognition. In face recognition a reference gallery contains faces of different persons and a separate face model is created for each person in the reference gallery. As a result, if the reference gallery contains faces of 1124 different persons, there are 1124 face models created and a captured face image is compared to each of the 1124 different face models and 1124 different similarity scores are determined. The face image with the highest score is taken as the best match. For quality assessment, instead of the 1124 different models, only one single generic model is constructed from the training images and only one score is determined for a captured face image. In this example this score directly reflects the quality of the face image.

Images of faces have characteristics that include shift (e.g. vertical or horizontal to be off centre), facial rotation, scale, resolution, facial pose and illumination. In this example the training images share characteristics that are preferred in the any image that is used for face recognition analysis. That is, an image that has these preferred characteristics is considered better in quality than an image that does not poses these preferred characteristics. In this example, the training images are frontal face images each of which are a substantially centred and well aligned with a substantially neutral pose and medium illumination. As a result, the content of the training images define these characteristics as representative of what a good quality image is. That means in a different application of the method a different training image set may be used that has different characteristics that define a quality image that is specific to that application.

Figure 2:
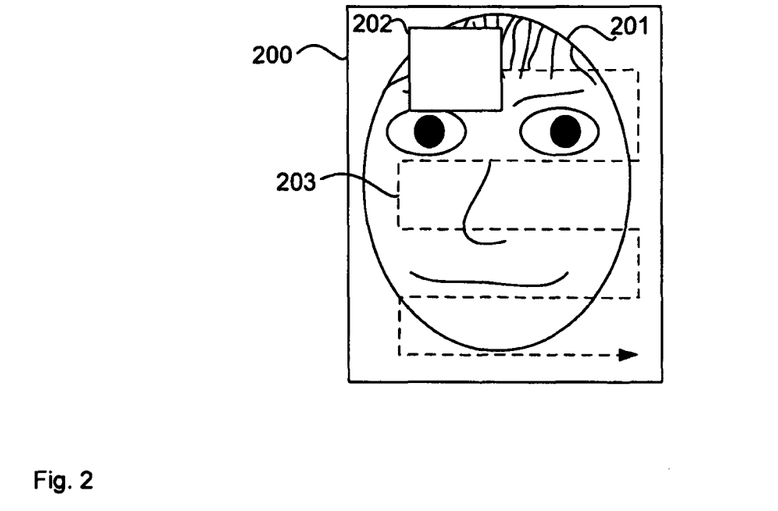
FIG. 2 illustrates a segmentation of a face image into patches.

FIG. 2 illustrates an image 200 comprising a face 201. A sub-image, also referred to as patch, 202 is moved in steps across the frame 200 along a predefined path 203. The size of the patch and the size of the steps may be such that the patches of subsequent steps overlap. In one example, the size of the image is 64×64 pixels, the size of the patch is 8×8 pixels and patches of subsequent steps overlap by 7 pixels. As a result there are 64−8+1=59 patches in each line of the image 200 and 59×59=3481 patches in the entire image 200. It is noted here that the training images as well as the later captured probe images are cropped and resized to the same size. Then they are further segmented into small patches of equal size, such that the patches of the training images are aligned with the patches of the captured images. That is, even in cases where the face in the captured frame is not well aligned, the patches after cropping and resizing are well aligned.

The model is comprised of sub-models, that is a generic patch model is generated for each patch. The generic patch model is created by performing a statistical modelling (such as multivariate Gaussian model) on the features extracted from the patches of training images. Features of each patch can be extracted using any suitable methods, such as discrete cosine transformation (DCT), Principal Component Analysis (PCA) or Gabor Wavelet Transformation. In this example, DCT is applied for feature extraction.

Figure 3:
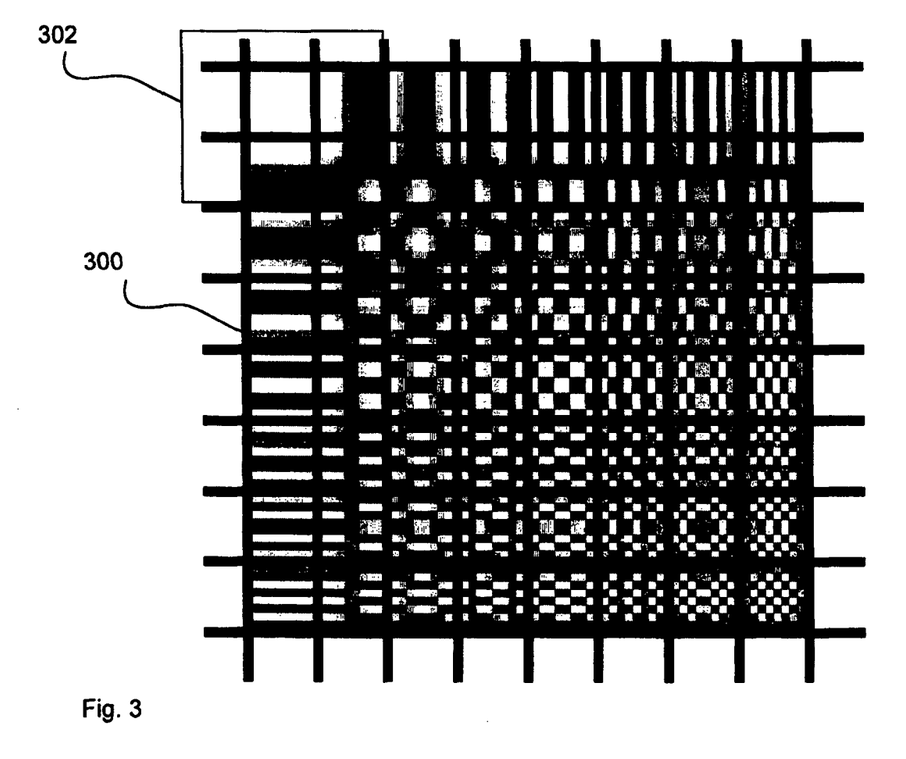
FIG. 3 illustrates a matrix of 2D-DCT basis functions.

FIG. 3 illustrates a matrix 300 of two-dimensional discrete cosine transformation (2D-DCT) basis functions. In this example, the matrix 300 comprises 8×8 different basis functions. Each of the patches of each of the training images is represented by a vector obtained by spectrum analysis using matrix 300. In other words, for each patch 8×8 coefficients are determined—one coefficient for each of the 8×8 frequencies in matrix 300. These DCT coefficients are arranged in a feature vector of dimension 64. Each patch is therefore transformed into a vector using the DCT coefficients. Throughout this specification parts of the face, such as eyes and nose, are referred to facial elements to avoid confusion between facial elements and features. The latter applies to features, such as DCT coefficients, extracted from the face image.

It is apparent from FIG. 3 that lower frequency components 302, towards the upper left of matrix 300, characterise the coarse appearance and descriptive properties of a face, such as the location of eyes and nose. The higher frequency components, towards the bottom right of matrix 300, characterise finer and discriminative properties of the face. Since the proposed method aims to determine whether a captured face is similar to a generic, average face, the discriminative properties, i.e. the higher frequencies components, of the faces are of minor interest. Therefore, only a small number of lower frequency components is used. In one example, only the frequencies of a 2×2 square at the top left of the matrix 300 are considered. Ignoring the DC component, the top left element of matrix 300 results in a feature vector of dimension 3. Of course, in other embodiments the feature vector may have less or more dimensions.

For each patch of each training image, the feature vector is determined by DCT. Then, the mean and covariance of the feature vectors of all the training images are computed.

In different examples the features are not determined by DCT and may not be based on frequency components, such as Haar-like features, local binary patterns (LBP) or scale-invariant feature transform (SIFT).

Figure 4:
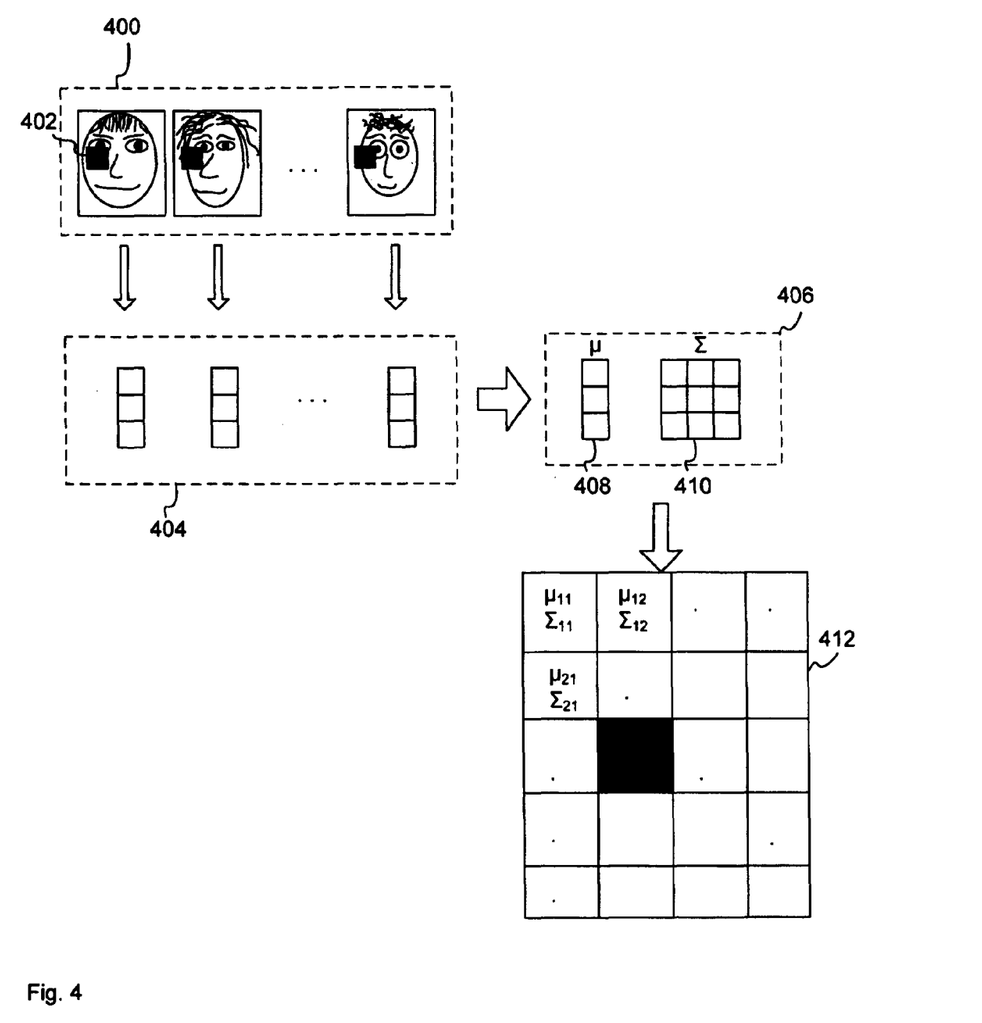
FIG. 4 illustrates a reference gallery, a set of three-dimensional feature vectors and a generic probabilistic face model.

FIG. 4 illustrates a library of training images 400 as stored on storage 506. The training images 400 are segmented into patches as described with reference to FIG. 2. One exemplary patch 402 at an exemplary patch location is shown on each of the training images. The following steps are described with reference to location of patch 402 but it is to be understood that theses steps are performed for each patch location independently.

A set of three-dimensional feature vectors 404 extracted for patch location 402 of the training images 400 by DCT and a generic probabilistic patch model 406 for patch location 402 is also shown. The set of feature vectors 404 comprises one feature vector for patch location 402 of each training image 400. In one example, the library comprises 1124 different training images. The generic probabilistic patch model 406 comprises a three-dimensional mean vector 408 and a 3×3 diagonal covariance matrix 410 of the set of feature vectors 404 for patch location 402. A similar generic probabilistic patch model is created for all the remaining patch locations. The mean vectors and covariance matrices for all patch locations are entered into a matrix forming a generic probabilistic face model 412. The entry in the matrix that relates to patch location 402 is show in solid black.

This generic face model 412, which is comprised of each of the patch models, is stored on computer storage 506 ready for use in the method defined by steps 104 to 124. In one example, the training images are deleted once the generic face model 412 is computed. In a different example, the generic face model is computed once by a high performance computer and exported to a number of less powerful client devices.

The next step in FIG. 1 of this example is to access 104 a frame of the streaming video that captures a person's face 504. Unlike the training images, frames accessed 104 will have pose variations, varying shadow conditions, blurring as well as alignment errors (e.g. in-plane rotations, horizontal and vertical shifts).

This retrieval step may be performed in real time, such that the frame of the streaming video is the next frame available from a capture device such as a surveillance video camera 502. Alternatively, a sequence of images can be captured by a still camera, stored on computer storage 506, and at a later time processed according to the following steps.

The frame is received as input to the computer 500 from the camera 502, such as by direct connection to an input port, over a local computer network (not shown) or over a wide area network such as the internet (not shown). In one alternative, the computer 500 is integrated into the camera 502. Alternatively, the frame may be pre-recorded and retrieved from storage 506. In another example, the computer is connected to multiple cameras targeting the same person or object such that it is more likely that at least one camera captures a good quality image of the face of the person.

A face detection algorithm is applied 106 to the frame. In one example OpenCV's Viola-Jones Haar-based face detector is used but any suitable face detection algorithm may be used in different examples. It is noted here that face detection only determines the location of a face in the frame and does not recognise the person associated with that face. The face detection algorithm also crops the frame to the location and dimension of the face contained in the frame resulting in a face image. In a different example the face fills the entire frame and the face detection algorithm does not crop the frame. In that example, the face image is identical to the frame. In yet another example, the frame comprises more than one face and the face detection algorithm crops the frame into separate face images. In this example, the faces need to be tracked such that good quality images for each face can be found separately without images of different faces being considered as belonging to the same person during later face recognition.

The next step is to normalise the dimensions of the face image such that the dimension of the face image is the same as the dimension of the training images. In one example, the dimension is 64×64 pixels.

The frame is then intensity normalised 108 for each pixel in order to amplify low intensity pixels and compress high intensity pixels according to a logarithmic normalisation function $$I_{log}(r,c) = \ln [I(r,c)+1]$$

where I(r,c) is the pixel intensity at location (r,c). The gradient for small intensity values is greater than the gradient for larger intensity values. As a result, smaller intensity values are spread out while greater intensity values are compressed. This property is helpful to reduce the intensity differences between skin colours and background lighting.

After the step of normalisation, the face image is segmented 110 into sub-images, referred to here as patches. The segmentation of the face image is similar to the segmentation of the training images. The same number of sub-images are defined from both the input image and training images and are all aligned. Such that each patch of the face image from the video frame corresponds to one sub-model and therefore are one entry in the matrix of the generic face model 412 in FIG. 4. Put another way the spatial relationship between each patch of the input image is the same as the spatial relationship between the patches used a training image. In one example each patch is normalised to have zero mean and unit variance to accommodate contrast variations between face images.

For each patch, the feature vectors, that is the DCT coefficients, are determined 112 as explained above in relation to the patches of the training images in step 102. In this example, a vector of three DCT coefficients is determined for each patch but less or more coefficients may be used in different examples.

The next step is to determine 114 is to determine the similarity of each patch of the face image to the corresponding patch of the generic face model. This similarity is expressed as a posterior probability for each patch that is determined by feeding the vector determined for that patch into the following Gaussian probability density function that is based on the generic face model:

$$p(x_i | \lambda_i) = \frac{e^{-\frac{1}{2}(x_i - \mu_i)^T \Sigma_i^{-1}(x_i - \mu_i)}}{(2\pi)^{\frac{d}{2}} |\Sigma|^{\frac{1}{2}}}$$

where $\lambda_i$ is a location specific multivariate Gaussian model, $\mu_i$ and $\Sigma_i$ are the mean and covariance matrix for the corresponding patch of the generic face model. As per step 102, the generic model 412 for each patch was trained using a pool of frontal images under appropriate lighting with neutral facial expression. All of the training images as well as the face images from the video frames are normalised, such as by scaling and aligning, to a fixed size of 64×64 pixels.

Other examples for modelling each patch from the training data, such as training images, are multivariate Gaussian distribution, Laplace distribution, histogram of frequency distribution, Poisson distribution. Generally, any distribution modelling technique or the mixture of these techniques can be used to model the patch.

The aim at this stage is not to recognise an individual face but to determine how close the patch of the face from the video frame is to an average patch at the same location that is represented by the generic face model. The formula above assigns a low probability to patches with DCT coefficients far from the mean $\mu_i$ of the probabilistic model and a high probability to patches with DCT coefficients close to the mean $\mu_i$ of the probabilistic model. As a result, the posterior probability reflects the similarity between the patch of the face image from the video frame and the generic face model 412.

In other examples, other image features and their combinations can be used to replace the DCT features, such as Local Binary Patterns (LBP), Principal Component Analysis (PCA), Gabor and SIFT. These features may be used to characterize different aspects of the image quality, such as expression changes, depending on what characteristics of the image need to be measured.

In yet another example, the patch size can be variable. That is patch size is not fixed over the whole image. Patch size may change at different regions of the image. For example, the patch size around eye area could be different from the patch size around mouth or chin area.

The combination of image features and variable patch size is also feasible. At different regions of the image, different features and patch size may be used. For example, around eye area, DCT features with patch size of 8 by 8 is used. Whilst, at chin area, Gabor features with patch size of 12 by 10 may be used and so on at other face regions. Next, the quality of the image is determined. That is, the posterior probabilities of all patches are combined to determine 116 a quality for the entire face image. Assuming that the probabilities of the patches are statistically independent from each other, these patch probabilities can be multiplied to determine the joint probability of the entire frame. In some examples, the patches may not be statistically independent but independence is assumed as an approximation without introducing excessive inaccuracies. Since additions are less expensive in computation cost than multiplications, the logarithm of the probabilities is used which results in a sum of logarithms to determine a quality score Q of a face image I:

$$Q(I) = \log[P(X|\Lambda)] = \frac{1}{N}\sum_{i=1}^{N}\log[p(x_i|\lambda_i)]$$

Without resorting to fusion techniques, the method produces a quality score for each face image, with the score simultaneously representing the degree of alignment errors, pose variations, scale similarity, shadowing and image sharpness (underlying resolution). Localisation of facial elements (i.e. eyes nose and mouth) is also not required in this method. In one example, the face detection algorithm in step 106, in particular for low resolution images, is inaccurate and as a result, the face images are misaligned by several pixels.

Due to the nature of the segmentation into small patches, misalignments of more than 2 pixels can be reliably detected and as a result, the inaccuracy of the face detection algorithm can be discovered. Since patches are relatively small, the model at each patch are sensitive enough to detect small changes, such as shift by 2 pixels. Optionally, these low quality images can be discarded by not performing further analysis on them with this method. In the same way the method can help to identify the most aligned face images to the model. When face detector detects a face, it can crop the face image in many different ways around the detected area. In each way, the image quality is measured for the cropped face. By choosing the best cropped face image based on the quality, the proposed method can help to minimize errors in further processing the misalignment.

Pose, illumination and resolution changes are also detected by the proposed method. In other examples the quality score is based on weighted summation of probabilities, entropy or weighted summation of logarithm of probabilities. Generally, any probability-based fusion technique or the mixture of these techniques can be used to generate a single score.

The quality score is then compared 118 to a threshold in order to determine whether the quality of the frame is sufficient for face recognition. In one example, the quality threshold is 1.4. In another example the quality threshold may be given based on the sigma value of the distribution, such as a three sigma threshold $\mu_g - 3\sigma_g$. If the quality is insufficient the frame is discarded 120.

It is then determined 122 whether enough face images are available for face recognition or whether the end of the video is reached, that is all available frames have been processed. The required number of face images may be a pre-determined number, such as ten. Alternatively, the quality of all face images from all frames may be determined and a number of highest scoring face images, such as ten, may be selected. As a further alternative, all face images above the quality threshold may be used for image recognition. If not enough face images are available the method restarts form step 102 to gather more frames. In other examples, the system can select top ten images with higher quality for recognition.

Once the face images are selected, face recognition is performed 124 on the selected frames. Face recognition may be performed based on Mutual Subspace Method (MSM) using a probabilistic Multi Region Histogram (MRH) or Local Binary Patterns (LBP). These method may use the higher frequency components which as described above are more discriminative.

The result of the method 100 may be displayed on the display of the computer 500. For example, an indication of the quality is displayed graphically or a numeric ranking of the frame compared to other frames is displayed. This indication of the quality may simply be a display of frames that met the quality criteria 108.

Alternatively or in addition, the result of the face recognition could be displayed, such as the matched face image and information of the person represented in the matched image. In one example the quality score is provided to a face recognition algorithm and is used as a weight to combine features for classification or face recognition. The face images with better quality are assigned a higher weight, which indicates that good quality images should contribute more to the recognition results.

In other examples, the method can be applied to select images that meet a desired characteristic where that characteristic is captured in the training images used to create the generic model. For example, training images may present certain facial expression, such as smile and in which case the method could be used to identify images that have good quality, that is smile in expression. In this way the characteristics, and in turn the definition of quality, is plug-and-playable in this method.

Figure 6:
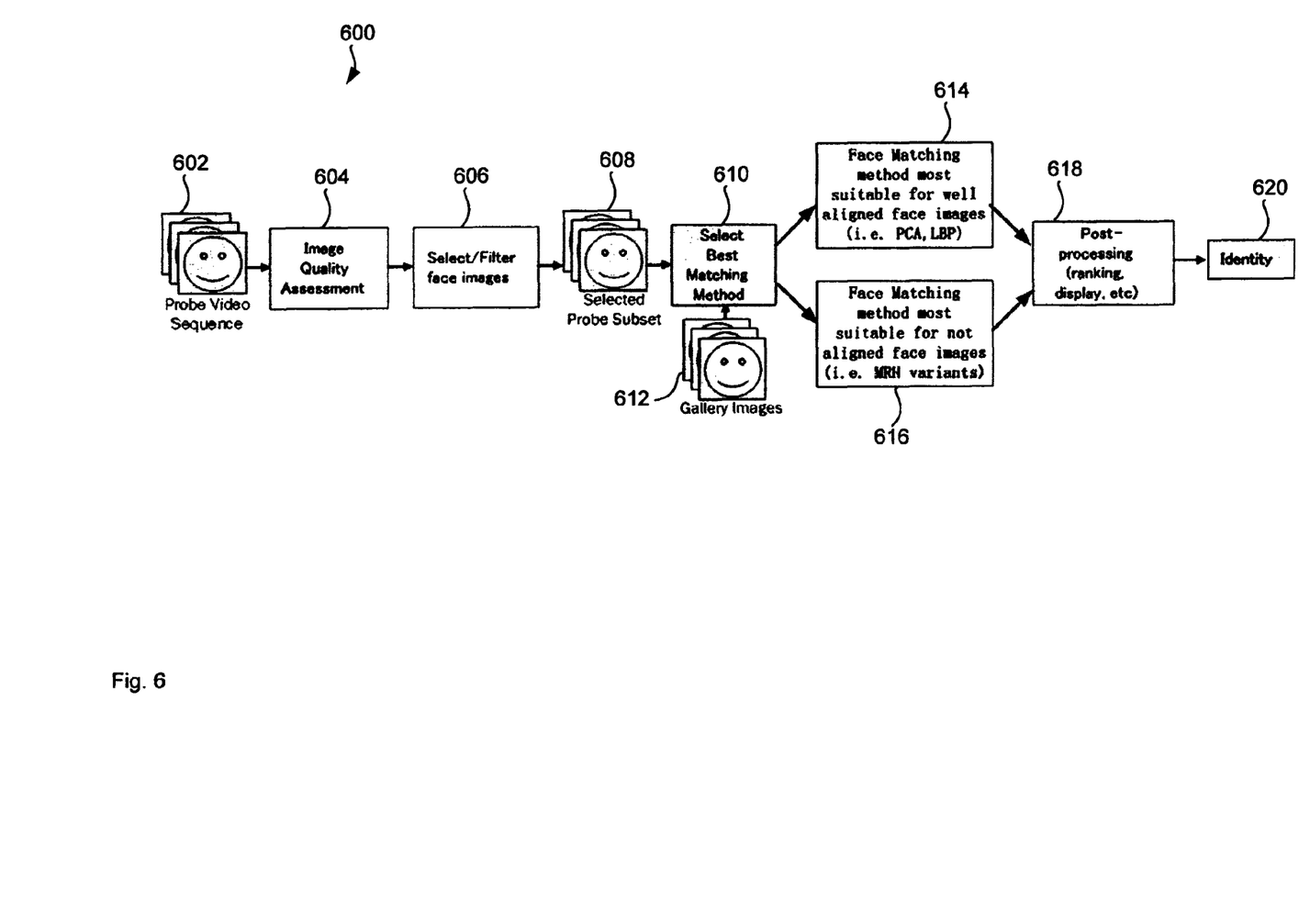
FIG. 6 illustrates a workflow for face recognition.

FIG. 6 illustrates a workflow 600 for a face recognition system. The workflow comprises a set of captured images 602 such as video frames that have satisfied a face detection test and have been normalised as described above. This set of captured face images 602 is then assessed for image quality 604 according to the methods described above. Based on the result of the quality assessment the face images are selected 606 resulting in a subset of face images 608 to be used for face recognition. It is noted here that face recognition may be performed on a single face image but if the face image is of low quality the recognition is not accurate. The accuracy of the face recognition algorithm increases with the number of face images used and in the scenario of video surveillance many images of the same face are readily available in different video frames. However, poor quality face images may jeopardise the face recognition quality. Therefore, the method proposed above selects only the face images with the best image quality.

Once the subset of face images 608 is selected, a most suitable face matching method is selected 610, which is based on gallery images 612. The main criteria for selection of the face matching method is how well aligned the face images are. If the face images are well aligned 614 methods like PCA and LBP are most suitable while in cases of not well aligned face images 616 methods like MRH variant are preferably chosen.

The result of the face matching method is provided to post processing methods 618, such as ranking and display and finally the identity of the face is determined 620.

While the above embodiments discuss the application of quality assessment for face images in particular, it can also be applied to other types of objects which can be modelled. Examples of types of objects include road signs and number plates. Of course, the object can be any suitable type of object, such as a physical three dimensional object or any other collection of features that define an object of interest that appears in the image. For example, a road sign or a trade mark device printed on objects that appear in the image.

Aside from using the quality score for selection or filtering, it can also be used as a weight of image importance for subsequent processing, such as recognition.

This approach can also be used for registration of images to align with the template. This can be done by generating a series of candidate images and the maximum quality score denotes the best aligned option.

This method can also be used with face verification, that is adaptively choosing a threshold based on the quality of face images.

The computer used in this invention could be any suitable computer, such as a processor incorporated within the camera itself or a distributed processing system such as over a network. In one alternative, the computer could be an embedded system, that is a computer system designed for specific control functions or tasks. It can be embedded as part of a large system. Embedded systems contain processing cores that are typically either microcontrollers or digital signal processors (DSP). As they are task specific, they can be engineered to reduce the size and cost, thus they are commonly found in a range of portable devices such as mobile phones and various types of cameras.

It should be understood that the techniques described here might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media (e.g. copper wire, coaxial cable, fibre optic media). Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "processing", "constructing" or "computing" or "calculating" or "determining" or "displaying" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A computer-implemented method for assessing quality of an image of an object, the method comprising:
determining a similarity of features of two or more sub-images of the image to a model of the object which is based on multiple training images of multiple different objects of a same type, the model is comprised of sub-models each modelled from multiple sub-images from the multiple training images, where each sub-model corresponds to a sub-image of the image, wherein determining similarity is based on the similarity of features of each sub-image to features modelled by the corresponding sub-model; and
determining the quality of the image based on the determined similarity of the two or more sub-images.

2. The computer-implemented method according to claim 1, wherein the method is used as a pre-processing step for the image, and further processing is based on the determined quality of the image.

3. The computer-implemented method according to claim 1, wherein each training image has multiple preferred characteristics that determine quality and a preferred characteristic includes one or more of a predetermined shift in the object, a predetermined rotation, a predetermined scale, a predetermined resolution, a predetermined pose, a predetermined illumination, and where the object is a face, a predetermined expression.

4. The computer-implemented method according to claim 1, wherein each sub-model models features by a mean vector and a covariance matrix which are based on features of a sub-image of each training image that the sub-model is based on.

5. The computer-implemented method according to claim 1, wherein the features of a sub-image are based on substantially only lower frequency components of the sub-image and the model is based on only lower frequency components of training images.

6. The computer-implemented method according to claim 1, wherein the features modelled by a sub-model is a mean value of the features of a sub-image of each training image that the sub-model is based on.

7. The computer-implemented method according to claim 1, wherein the features modelled by a sub-model are based on a Gaussian probability density function characterised by the mean vector and a covariance matrix of the features of a sub-image of each training image that the sub-model is based on.

8. The computer-implemented method according to claim 1, wherein determining a similarity comprises determining a probability for the features of the sub-image of the image based on the Gaussian probability density function.

9. The computer-implemented method according to claim 1, wherein the sub-image of the image is aligned with the sub-images of each training images the corresponding sub-model is based on.

10. The computer-implemented method according to claim 1, wherein the determining a similarity is performed independently for each sub-image.

11. The computer-implemented method according to claim 1, wherein determining similarity comprising determining one similarity measure for each sub-image and determining quality of the image is based on a combination of the determined similarity of the two or more sub-images.

12. The computer-implemented method according to claim 11, wherein a combination of the determined similarities of the two or more sub-images comprises determining a probability for each sub-image independently and determining a joint probability based on the probabilities for each sub-image of the image.

13. The computer-implemented method according to claim 1, wherein the method further comprises providing as output an indication of the determined quality of the image.

14. The computer-implemented method according to claim 1, wherein the method further comprises storing an indication of the determined quality of the image in non-volatile memory.

15. The computer-implemented method according to claim 1, wherein the method further comprises the steps of:
repeating the method for multiple different images to determine the quality of each of the multiple images; and
performing further processing of the images based on the determined quality.

16. The computer-implemented method according to claim 1, wherein the object is a face.

17. The computer-implemented method according to claim 16, wherein the further processing is performing face recognition or face verification on a subset of images determined as having better quality.

18. A non-transitory computer readable medium comprising instructions that when executed by a computer causes the computer to perform the method according to claim 1.

19. A computer to assess the quality of an image of an object, the computer comprising:
computer storage to store a model of the object which is based on multiple training images of multiple different objects of a same type, the model is comprised of sub-models each modelled from multiple sub-images from the multiple training images, where each sub-model corresponds to a sub-image of the image; and
a processor to determine a similarity of features of two or more sub-images of the image to the model, wherein determining similarity is based on the similarity of features of each sub-image to features modelled by the corresponding sub-model, and to determine the quality of the image based on the determined similarity.

* * * * *